(12) United States Patent
Faller et al.

(10) Patent No.: US 9,152,675 B2
(45) Date of Patent: Oct. 6, 2015

(54) SELECTION AND RANKING OF COMMENTS FOR PRESENTATION TO SOCIAL NETWORKING SYSTEM USERS

(71) Applicant: Facebook, Inc., Menlo Park, CA (US)

(72) Inventors: Eric Faller, Palo Alto, CA (US); Sumeet Vaidya, Menlo Park, CA (US); Aditya Brij Koolwal, San Francisco, CA (US); Matthew Kai-Shing Choi, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 171 days.

(21) Appl. No.: 13/842,815

(22) Filed: Mar. 15, 2013

(65) Prior Publication Data

US 2014/0280236 A1    Sep. 18, 2014

(51) Int. Cl.
*G06F 17/30* (2006.01)

(52) U.S. Cl.
CPC ...... *G06F 17/3053* (2013.01); *G06F 17/30699* (2013.01); *G06F 17/30867* (2013.01)

(58) Field of Classification Search
CPC .......... G06F 17/3053; G06F 17/30699; G06F 17/30867
USPC ......... 707/723, 732, 735, 748, 752, 709, 791, 707/728, 710
See application file for complete search history.

(56) References Cited

U.S. PATENT DOCUMENTS

| | | | |
|---|---|---|---|
| 8,321,463 B2* | 11/2012 | Cierniak et al. | 707/791 |
| 8,738,654 B2* | 5/2014 | Cierniak et al. | 707/791 |
| 2009/0119173 A1* | 5/2009 | Parsons et al. | 705/14 |
| 2009/0125382 A1* | 5/2009 | Delepet | 705/10 |
| 2011/0145219 A1* | 6/2011 | Cierniak et al. | 707/709 |
| 2013/0006978 A1* | 1/2013 | Cierniak et al. | 707/728 |
| 2014/0250099 A1* | 9/2014 | Cierniak et al. | 707/710 |

* cited by examiner

*Primary Examiner* — Frantz Coby
(74) *Attorney, Agent, or Firm* — Fenwick & West LLP (57) ABSTRACT

When a social networking system receives a request from a requesting user for a content item associated with one or more comments, the social networking system determines an interest score for each comment. The interest score for a comment indicates a measure of the user's likelihood of being interested in the comment. Based on the calculated interest scores, the social networking system selects one or more comments for presentation to the viewing user along with the content item. The social networking system may specify an order in which the selected comments are presented based on the interest scores of the selected comments.

16 Claims, 6 Drawing Sheets

SELECTION AND RANKING OF COMMENTS FOR PRESENTATION TO SOCIAL NETWORKING SYSTEM USERS

BACKGROUND

Embodiments of the present disclosure relate generally to social networking systems and, more specifically, to ranking user-provided comments associated with content such as posts in a social networking system.

Social networking systems have become prevalent in recent years because they allow their users to easily connect to and communicate with other users. Through social networking systems, users share a variety of content. Examples of content items shared by users through a social networking system include pictures, videos, articles, and status updates. Typically, social networking system users may comment on content shared by other users. For example, a user may provide a comment indicating its thoughts on an article shared by another user via the social networking system.

Some content items receive a large number of comments (e.g., 30 or more comments). For example, a large number of comments may be received for content items including controversial subject matter or posted by a user connected to a large number of additional social networking system users. Hence, when a user attempts to view comments for some content items, the user will likely be overwhelmed by the number of comments and lose interest in viewing the comments.

SUMMARY

To better present comments on received content to a user of a social networking system, the social networking system selects comments for presentation to the user and determines an order for presenting the content. For example, when the social networking receives a request from a user to view an interface including content item associated with at least a threshold number of comments, the social networking system selects a set of comments for presentation to the user and an order for presenting the selected comments. To select comments for presentation, the social networking system calculates an interest score for each comment associated with a content item. A comment's interest score indicates a measure of the likelihood that the user viewing the comment will be interested in the comment. Based on the calculated interest scores, the social networking system selects one or more comments for presentation to the requesting user. The social networking system may also order the selected comments based at least in part on their interest scores. The social networking system transmits instructions to a client device of the user identifying the selected comments and an order for presenting the selected comments based on their interest scores.

Social networking system users may also reply to comments associated with a content item. A reply is content associated with a comment; whereas a comment is directed to the content item itself, a reply is directed to one of the content item's comments or possibly to another reply. If a comment selected for presentation is associated with one or more replies, the social networking system determines whether to present one or more of the replies with the selected comment. To determine whether to present a reply, the social networking system calculates an interest score for each reply that indicates a measure of the likelihood that the user will be interested in the reply and selects replies with interest scores equaling or exceeding a threshold for presentation. In one embodiment, if multiple replies associated with a comment are selected for presentation, the social networking system may rank the selected replies based on their interest scores and present the selected replies in an order based on the ranking. The social networking system transmits instructions to the client device identifying the selected replies and the order in which to present the selected replies.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1A:
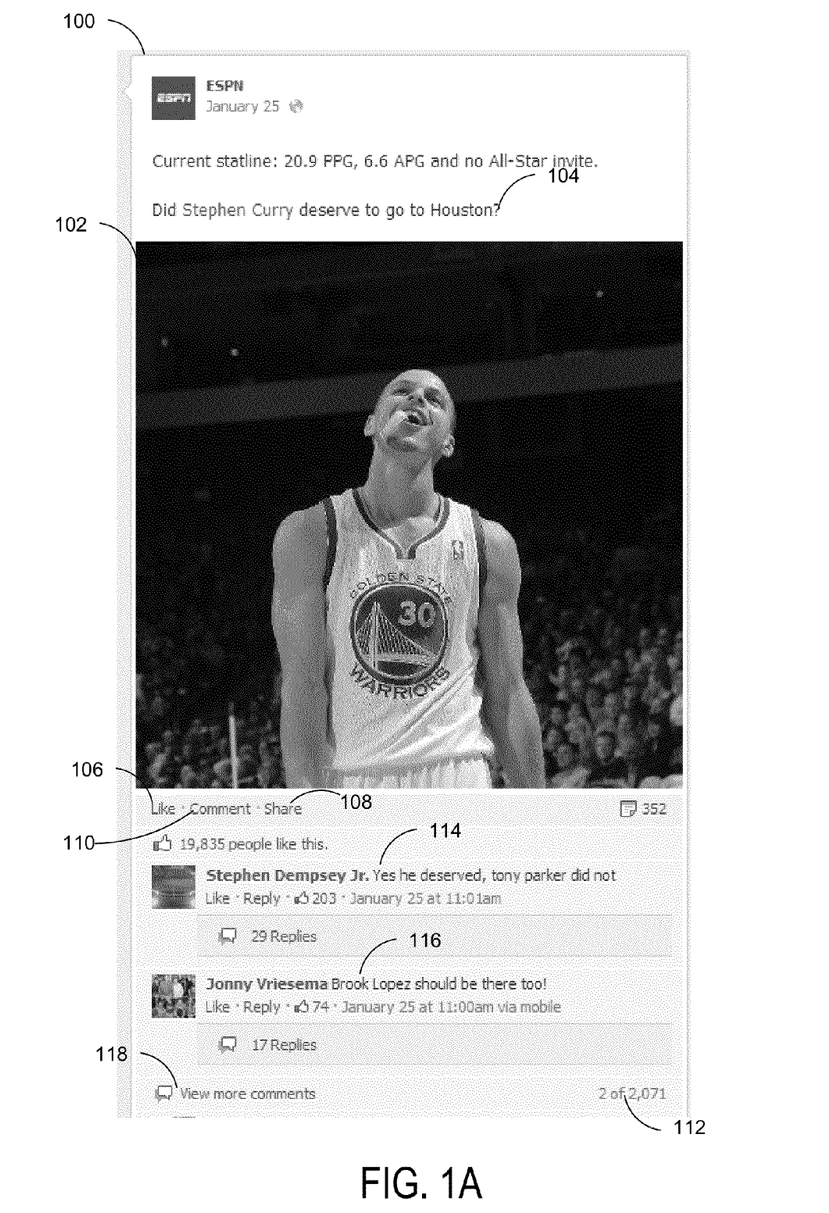
FIGS. 1A-1C are illustrations of an example user interface in which comments provided for a content item are ranked, in accordance with an embodiment of the invention.
Figure 1B:
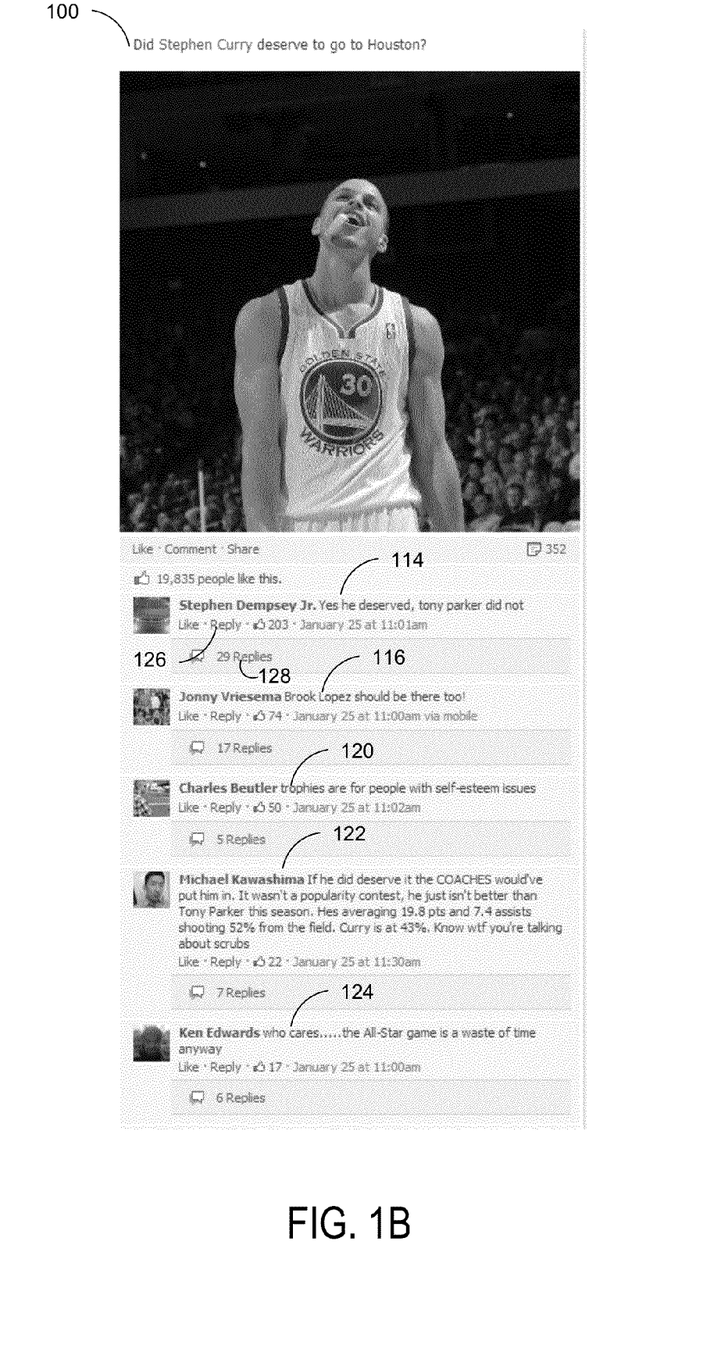
Figure 1C:
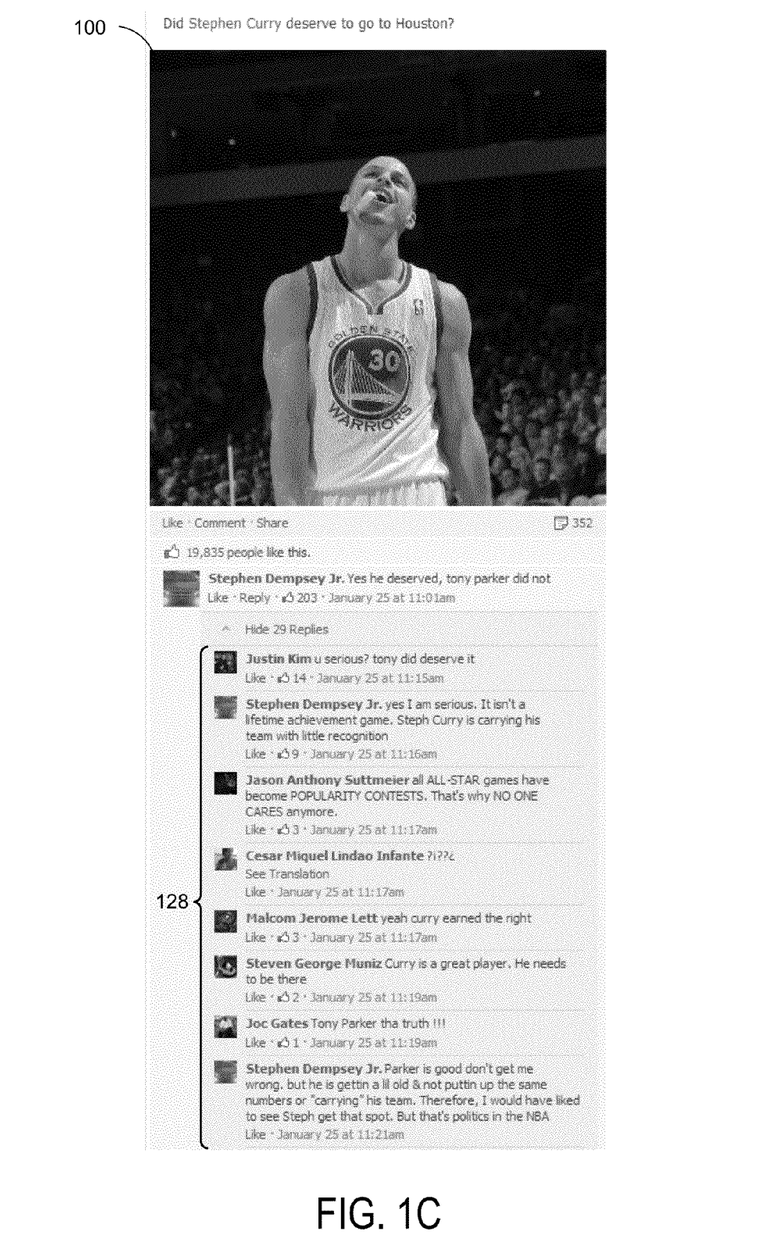

FIGS. 1A-1C show examples of a user interface where comments associated with a content item 100 and provided by social networking system users are ranked for presentation to a user of the social networking system. In the example of FIG. 1A, the content item 100 is a picture 102 of a basketball player and an associated caption 104. Along with the content item 100, various interface elements 106, 108, 110 are presented. A user of the social networking system viewing the content item 100 may indicate a preference for the content item (i.e., that it "likes" the content item 100) by selecting interface element 106 and may share the content item with another social networking system user by selecting interface element 108. Additionally, a user may provide a comment associated with the content item 100 by selecting link 110. A comment is content, such as text data, received from a user associated with the content item 100. For example, a comment expresses a user's opinion or reaction to the content item 100.

In the example of FIG. 1A, a comment count 112 is also displayed that indicates a total number of comments associated with content item 110. As shown in FIG. 1A, the comment count 112 indicates the content item 100 has 2,071 comments. When the content item 100 is initially presented to a user, a specified number of the comments associated with the content item 100 are presented to the user. In this example, two comments, comments 114 and 116, are initially presented.

The social networking system selects comments 114 and 116 from the 2,071 comments for presentation based on an interest score calculated for each comment associated with the content item 100. A comment's interest score indicates a measure of the likelihood that the user viewing the content item 100 will be interested in the comment. In one embodiment, the social networking system selects comments 114 and 116 for presentation because they have the highest interest scores of the 2,071 comments. Alternatively, comments 114 and 116 are selected for presentation because they have at least a threshold interest score. Therefore, comments 114 and 116 are presented to the user because they are most likely to be of interest to the user.

An additional interface element 118 is presented along with comments 114 and 116, and if the user accesses the additional interface element 118, additional comments are retrieved from the social networking system for presentation to the user. FIG. 1B shows presentation of additional comments 120, 122, and 124, along with comments 114 and 116, when the additional interface element 118 is selected. The comments 114, 116, 120, 122, and 124 are ordered according to their respective interest scores, where the comment 114 with the highest interest score is displayed first, the comment 116 with the second highest score is displayed second, and so on. Therefore, instead of ordering the comments 114, 116, 120, 122, and 124 in a chronological order based on when they were provided to the social networking system, comments 114, 115, 120, 122, and 124 are presented in an order based on the likelihood of the user having an interest in each comment 114, 115, 120, 122, and 124.

However, presenting comments in an order based on likelihood of user interest rather than in chronological order makes it difficult for users to create a conversation by responding to comments by other users. For example, if a user posts the comment "Jane what do you think about this picture?" If Jane responds with a comment, ordering comments according to their interest scores may cause the responding comment to be displayed in a location distant from the comment including the question with other comments separating the comment including the question and the comment including the response. This type of presentation may confuse a user viewing the comments.

To allow users to engage in conversations, a reply interface element 126 is presented along with a comment. By accessing the reply interface element 126, a user may associate a reply with the comment proximate to the accessed reply interface element 126. The reply is associated with the comment and includes user-provided content. Additionally, the number of replies 128 may be displayed along with a comment. For example, as shown in FIG. 1B, the number of replies 128 indicates that comment 114 has received 29 replies 128. If a viewing user requests to view the replies to comment 114, replies associated with comment 114 are retrieved and presented to the viewing user as shown in FIG. 1C. As shown in FIG. 1C, replies are displayed indented from their associated comment to illustrate the relationship between the replies and the comment. However, in other embodiments, any suitable display format may be used to differentiate replies from comments. In one embodiment, shown in FIG. 1C, replies are ordered in chronological order according to the time when they were received by the social networking system. This allows users to provide replies to a comment to establish a conversation with each other.

System Architecture

Figure 2:
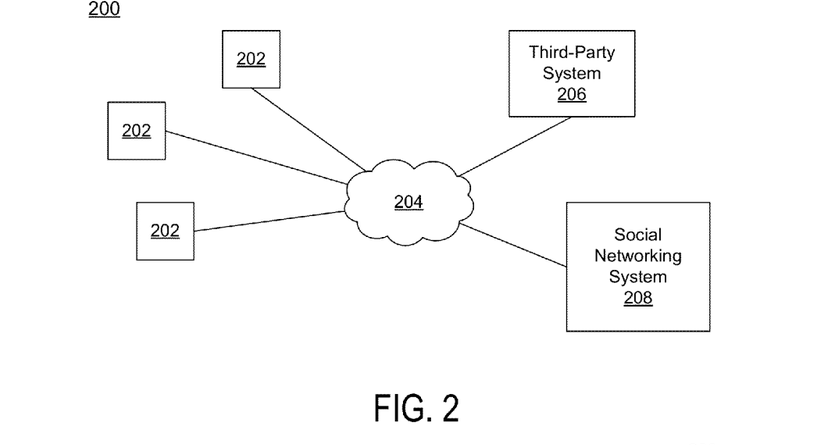
FIG. 2 is a block diagram illustrating a system environment for a social networking system, in accordance with an embodiment of the invention.

FIG. 2 is a block diagram of a system environment 200 for a social networking system 208. The system environment 200 shown by FIG. 2 comprises one or more client devices 202, a network 204, one or more third-party systems 206, and the social networking system 208. In alternative configurations, different and/or additional components may be included in the system environment 200. The embodiments described herein can be adapted to online systems that are not social networking systems.

The client devices 202 are one or more computing device capable of receiving user input as well as transmitting and/or receiving data via the network 204. In one embodiment, a client device 202 is a conventional computer system, such as a desktop or a laptop computer. Alternatively, a client device 202 may be a device having computer functionality, such as a personal digital assistant (PDA), a mobile telephone, a smartphone or another suitable device. A client device 202 is configured to communicate via the network 204. In one embodiment, a client device 202 executes an application allowing a user of the client device 202 to interact with the social networking system 208. For example, a client device 202 executes a browser application to enable interaction between the client device 202 and the social networking system 208 via the network 204. In another embodiment, a client device 202 interacts with the social networking system 208 through an application programming interface (API) running on a native operating system of the client device 202, such as IOS® or ANDROID™.

The client devices 202 are configured to communicate via the network 204, which may comprise any combination of local area and/or wide area networks, using both wired and/or wireless communication systems. In one embodiment, the network 204 uses standard communications technologies and/or protocols. For example, the network 204 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 204 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 204 may be represented using any suitable format, such as hypertext markup language (HTML) or extensible markup language (XML). In some embodiments, all or some of the communication links of the network 204 may be encrypted using any suitable technique or techniques.

One or more third party systems 206 may be coupled to the network 204 for communicating with the social networking system 208, which is further described below in conjunction with FIG. 3. In one embodiment, a third party system 206 is an application provider communicating information describing applications for execution by a client device 202 or communicating data to client devices 202 for use by an application executing on the client device 202. In other embodiments, a third party system 206 provides content or other information for presentation via a client device 202. A third party system 206 may also communicate information to the social networking system 208, such as advertisements, content, or information about an application provided by the third party system 206.

Figure 3:
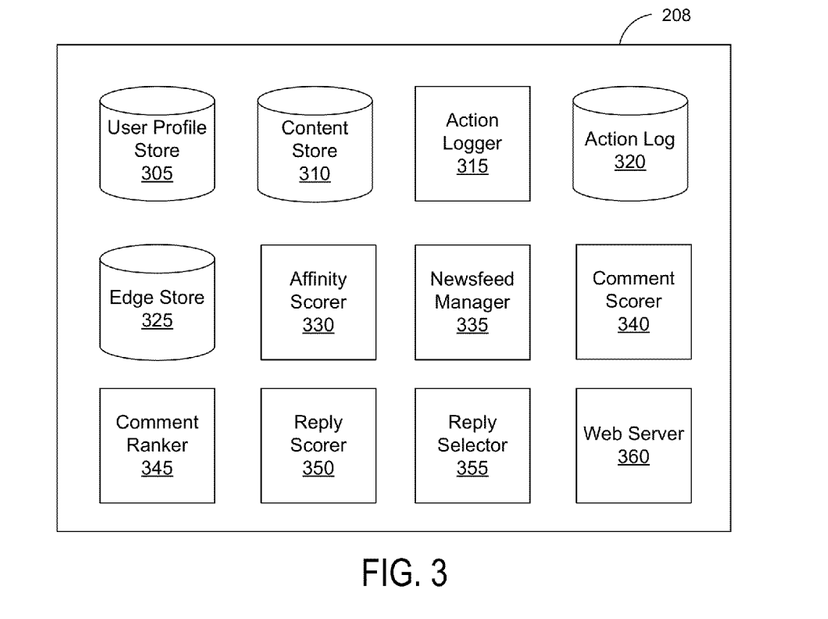
FIG. 3 is a block diagram of a system architecture of a social networking system, in accordance with an embodiment of the invention.

FIG. 3 is an example block diagram of an architecture of the social networking system 208. The social networking system 208 shown in FIG. 3 includes a user profile store 305, a content store 310, an action logger 315, an action log 320, an edge store 325, an affinity scorer 330, a newsfeed manager 335, a comment scorer 340, a comment ranker 345, a reply scorer 350, a reply selector 355, and a web server 360. In other embodiments, the social networking system 208 may include additional, fewer, or different components for various applications. Conventional components such as network interfaces, security functions, load balancers, failover servers, management and network operations consoles, and the like are not shown so as to not obscure the details of the system architecture.

Each user of the social networking system 208 is associated with a user profile, which is stored in the user profile store 305. A user profile includes declarative information about the user that was explicitly shared by the user and may also include profile information inferred by the social networking system 208. In one embodiment, a user profile includes multiple data fields, each describing one or more attributes of the corresponding user of the social networking system 208. Examples of information stored in a user profile include biographic, demographic, and other types of descriptive information, such as work experience, educational history, gender, hobbies or preferences, location and the like. A user profile may also include content items (e.g., images or videos) stored in the content store 310 which were provided by the user of the profile to the social networking system 208 for sharing with other users. In certain embodiments, a content item may be tagged with identification information of users of the social networking system 208 displayed or referenced in the item. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the social networking system 208, user profiles may also be stored for entities such as businesses or organizations. This allows an entity to establish a presence on the social networking system 208 for connecting and exchanging content with other social networking system users. The entity may post information about itself, about its products or provide other information to users of the social networking system 208 using a brand page associated with the entity's user profile. Other users of the social networking system 208 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 310, such as status updates, photos tagged by users to be associated with other objects in the social networking system 208, events, groups or applications. In some embodiments, objects are received from third-party systems 206 or third-party applications separate from the social networking system 208. In one embodiment, objects in the content store 310 represent single pieces of content, or content "items." Hence, users of the social networking system 208 are encouraged to communicate with each other by posting text and content items of various types of media through various communication channels. This increases the amount of interaction of users with each other and increases the frequency with which users interact within the social networking system 208.

In one embodiment, comments provided by users for a content item are stored in the content store 310 along with the associated content item. As described above, a comment may be a remark of a user expressing an opinion or reaction or any other user-provided data. For example, a comment associated with a content item is text or other data expressing a user's opinion or reaction to the content item. A comment may include text data, image data, video data, audio data, links to other content, or any other suitable information. Additionally, replies associated with a comment are stored in the content store 310 along with the corresponding comment. An association between a reply and a comment is also included in the content store 310. A reply may also be associated with a reply, with the association stored in the content store 310. A reply may include text data, image data, video data, audio data, links to other content, or any other suitable information.

As described herein, a user provides a comment or reply to the social networking system 308 is also referred to as user "posting" the comment or reply. In one embodiment, for a stored comment or reply the content store 310 includes the time and date when a comment or reply was posted, the user posting the comment or reply, a geographic location associated with the comment or reply, a type of device used for posting the content or reply, the number of users that have expressed a preference for the comment or reply, identifiers of users expressing a preference for the comment or reply, the dates and times when the preferences for the comment or reply were expressed, the number of users that have identified a comment as unwanted, user identifiers of users identifying a comment or reply as unwanted, and the dates and times when the comment or reply was identified as unwanted. The information stored for comments and replies may be maintained in the content store 310 based on information stored in the action log 320 described below.

The action logger 315 receives communications about user actions internal to and/or external to the social networking system 208, populating the action log 320 with information about user actions. Examples of actions include adding a connection to another user, posting a comment, posting a reply, sending a message to another user, uploading an image, reading a message from another user, viewing content associated with another user, attending an event posted by another user, among others. In addition, a number of actions may involve an object and one or more particular users, so these actions are associated with those users as well and stored in the action log 320.

The action log 320 may be used by the social networking system 208 to track user actions on the social networking system 208, as well as actions on third party systems 206 that communicate information to the social networking system 208. Users may interact with various objects on the social networking system 208, and information describing these interactions is stored in the action log 320. Examples of interactions with objects include: commenting on content items, replying to a comment, sharing links, checking-in to physical locations via a mobile device, accessing content items, and any other interactions. Additional examples of interactions with objects on the social networking system 208 that are included in the action log 320 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 320 may record a user's interactions with advertisements on the social networking system 208 as well as with other applications operating on the social networking system 208. In some embodiments, data from the action log 320 is used to infer interests or preferences of a user, augmenting the interests included in the user's user profile and allowing a more complete understanding of user preferences.

The action log 320 may also store user actions taken on a third party system 206, such as an external website, and communicated to the social networking system 208. For example, an e-commerce website that primarily sells sporting equipment at bargain prices may recognize a user of a social networking system 208 through a social plug-in enabling the e-commerce website to identify the user of the social networking system 208. Because users of the social networking system 208 are uniquely identifiable, e-commerce websites, such as this sporting equipment retailer, may communicate information about a user's actions outside of the social networking system 208 to the social networking system 208 for association with the user. Hence, the action log 320 may record information about actions users perform on a third party system 206, including webpage viewing histories, advertisements that were engaged, purchases made, and other patterns from shopping and buying.

In one embodiment, the edge store 325 stores information describing connections between users and other objects on the social networking system 208 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 208, such as expressing interest in a page on the social networking system 208, sharing a link with other users of the social networking system 208, and commenting on posts made by other users of the social networking system 208.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 208, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The affinity scorer 330 calculates affinity scores for users of the social networking system 208 based on information stored in the action log 320 and the edge store 325. Affinity scores are computed by the affinity scorer 330 over time to approximate a user's interest in objects or other users of the social networking system 208. Affinity scores may be based on a variety of factors. For example, the number of connections to additional users common to a user and another user may be used to determine the user's affinity for the other user. Additional examples of information used to determine a user's affinity for another user include: the type of connections to additional users shared between the user and the other user, the number of interactions the user has had with the other user, how recently the two users have interacted with each other, and the number of interactions the user has had with content shared by the other user. Computation of affinity scores is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety.

In one embodiment, the social networking system 208 identifies stories likely to be of interest to a user through a "newsfeed" presented to the user. A story presented to a user describes an action taken by an additional user connected to the user and identifies the additional user. Examples of an action described by a story include: a user posting/sharing a content item, a user expressing a preference (i.e., liking) for an object, and a user updating its profile. In some embodiments, a story describing an action performed by a user may be accessible to users that are not connected to the user that performed the action. The newsfeed manager 335 may generate stories for presentation to a user based on information in the action log 320 and in the edge store 325 or may select candidate stories included in content store 310. One or more of the candidate stories are selected and presented to a user by the newsfeed manager 335.

For example, the newsfeed manager 335 may receive a request to present one or more stories to a social networking system user. The newsfeed manager 335 accesses one or more of the user profile store 305, the content store 310, the action log 320, and the edge store 325 to retrieve information about the identified user. For example, stories or other data associated with users connected to the identified user are retrieved. The retrieved stories or other data are analyzed by the newsfeed manager 335 to identify content likely to be relevant to the identified user. For example, stories associated with users not connected to the identified user or stories associated with users for which the identified user has less than a threshold affinity are discarded as candidate stories. Based on various criteria, the newsfeed manager 335 selects one or more of the candidate stories for presentation to the identified user.

In various embodiments, the newsfeed manager 335 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 305. The newsfeed manager 335 may also determine the order in which selected stories are presented via the newsfeed. For example, the newsfeed manager 335 may determine that a user has a highest affinity for a specific user and increase the number of stories in the newsfeed associated with the specific user or modifies the positions in the newsfeed where stories associated with the specific user are presented.

The newsfeed manager 335 may also account for actions by a user indicating a preference for types of stories and selects stories having the same, or similar, types for inclusion in the newsfeed. Additionally, newsfeed manager 335 may analyze stories received by social networking system 208 from various users to obtain information about user preferences or actions from the analyzed stories. This information may be used to refine subsequent selection of stories for newsfeeds presented to various users.

The comment scorer 340 calculates and maintains comment scores of comments associated with content items stored in the content store 310. As described below, comment scores are used by the comment ranker 345 to select comments for presentation to a user. In some embodiments, the comment scores may be used to determine an order in which the selected comments are presented. A comment score for a comment indicates the popularity of the comment among users or the likely popularity of the comment among users. The comment score may be based on prior user interactions with the comment. For example, a comment for which a large number of users have expressed a preference may have a higher comment score than a comment that has been marked as unwanted.

The comment scorer 340 calculates a comment score for a comment associated with a content item using multiple characteristics of the comment. Examples of characteristics used to calculate a comment's comment score include: the total number of users that have expressed a preference for the comment (i.e., that "liked" the comment), the number of users that have expressed a preference for the comment within a threshold time period (e.g., in the last week), the total number of times the comment has been marked unwanted by users, the number of times the comment has be marked as unwanted within a threshold time period (e.g., in the last week), the number of times within a threshold time period that users have expressed a preference for comments posted by the user that posted the comment associated with the item (i.e., the commenter), the number of times that users have marked comments posted by the commenter as unwanted within a threshold time period, whether the user that posted the content item associated with the comment indicated a preference for the comment, whether the user that posted the content item associated with the comment indicated the comment was unwanted, whether the user that posted the content item also posted the comment, whether the social networking system 208 automatically marked the comment unwanted, or any other suitable information.

Another characteristic that may be considered when determining a comment score of a comment is similarity between a topic included in the comment and the topic of the content item associated with the topic. In one embodiment, to determine whether the comment addresses a similar topic to that of the content item, the comment scorer 340 identifies the text of the comment and text included with the content item. The comment scorer 340 compares the text of the comment with text of the content item to determine the number of words common to the comment and the content item. Based on the number of common words, the comment scorer 340 determines whether the comment addresses a similar topic to that of the content item. For example, if a threshold number of words are common, the comment scorer 340 determines the comment and content item address a similar topic. Alternatively, to identify topics associated with content items and comments, the comment scorer 340 identifies anchor terms included in a content item and in a comment. The meaning of the anchor terms for the content item and for the comment are determined as further described in U.S. application Ser. No. 13/167,701, filed Jun. 24, 2011, which is hereby incorporated by reference in its entirety. Based on the meaning of the anchor terms from the content item and the comment, the comment scorer 340 determines if the comment and content item address a similar topic.

Also a characteristic that may be considered when determining a comment score of a comment is a reputation of the commenter. The commenter may have a bad reputation, for example, if it is believed that the commenter is pretending to be someone else (i.e., commenter created a fake account). However, a commenter may have a good reputation if the commenter has connections with many different users or has connections with high profile users (e.g., celebrities).

In one embodiment, the comment scorer 340 associates each characteristic with a specified value and combines the values to generate a comment score. The value contributed by a characteristic may be a positive number, a negative number, or zero. For example, if the user that posted the content item marked the comment as unwanted, a value of −5 may be applied to the interest score. However, if the user did not mark the comment as unwanted, a value of 1 is applied to the interest score. The values contributed by each characteristic are combined to determine the comment's interest score. Different weights may be associated with the different values when they are combined. For example, a comment score for a comment is determined using the following function:

$$\text{CommentScore} = [\text{total number of users that expressed a preference for the comment}] + [3(\text{number of users that expressed a preference for the comment in the last week})] + [(-1)(\text{number of times comment has been marked as unwanted})] + [(10)(\text{whether user that posted content item also posted comment})]$$

As shown in the scoring function above, applying weights to different characteristics allows different characteristics to differently influence the interest score. For example, in the above function, more weight is given to the number of users that expressed a preference for the comment in the last week than to the total number of users that have expressed a preference. The additional significance of the users expressing a preference for the comment within the last week is caused by the increased value of the weight applied to the number of users expressing a preference for the comment within the past week.

In one embodiment, the comment scorer 340 initially calculates the comment score of a comment when the comment is provided to social networking system 208 and periodically updates the comment score. The comment scorer 340 may update the comment score of a comment after a user interacts with the comment by, for example, expressing a preference for the comment or marking it as unwanted. Alternatively, the comment scorer 304 updates a comment's comment score at periodic time intervals.

The comment ranker 345 selects comments for presentation to a user. Additionally, the comment ranker 345 may determine the order in which selected comments are presented to the user. A user may request an interface that includes one or more content items from the social networking system 208. For example, a user requests a user profile from the user profile store 305 that includes a content item. As another example, a user may request a newsfeed generated by the newsfeed manager 335 that includes multiple content items. When content requested by a user includes a content item associated with a threshold number of comments, the comment ranker 345 retrieves interest scores for each of the comments from the comment scorer 340 and selects comments for presentation based at least in part on the interest scores.

To select comments for presentation, the comment ranker 345 identifies comments associated with content item from the content store 310. For each identified comment, the comment ranker 345 calculates an interest score indicating a measure of the likelihood that the user that requested the content (i.e., the requesting user) will be interested in the comment. In one embodiment, to calculate the interest score of a comment, the comment ranker 345 identifies an affinity score between the requesting user and a user providing the comment from the affinity scorer 330 and retrieves a comment score for the comment from the comment scorer 340. The comment score indicates the popularity or likely popularity of the comment among social networking system users in general. The comment ranker 345 combines the affinity score and comment score to obtain the interest score for the comment. In one embodiment, the affinity score and comment score are combined by summing the two scores. In other embodiment the affinity score and comment score are multiplied or combined in any other suitable manner.

The comment ranker 345 selects a set of comments from the identified comments for presentation based on their associated interest scores. For example, the comment ranker 345 selects a specified number of comments (e.g., three comments) for initial presentation with the content item in the interface. In one embodiment, the comment ranker 345 selects a set of comments having the highest interest scores; alternatively, the comment ranker 345 selects a set of comments having at least a threshold interest score. The comment ranker 345 transmits the selected set of comments to the client device 202 of the requesting user for presentation with the content item. In one embodiment the comment ranker 345 also ranks the selected set of comments based on their interest scores and transmits to the client device 202 instructions to display the set of comments in an order based on the ranking. For example, the comment ranker 345 instructs the client device 202 to display the set of comments from highest interest score to lowest interest score. In this example, the comment from the set of comments with the highest interest score is displayed proximate to the content item while the comment with the lowest interest score is displayed farthest from the content item.

If the content item is associated with a greater number of comments than the number included in the set of comments, an option to request additional comments to view is presented to the requesting user along with the set of comments. If the requesting user requests additional comments, the comment ranker 345 selects an additional set of comments from the identified comments based on their associated interest score. The additional set of comments may include a specified number of additional comments (e.g., 10 additional comments). The comment ranker 345 transmits the additional set of comments to the client device 202 for presentation and may transmit an order in which to present comments in the set of comments and in the additional set of comments. As described above, the order for presentation of the comments may be based on their corresponding interest scores. Therefore, comments are presented in an order that reflects the requesting user's a predicted interest of the requesting user for each displayed comment.

The reply scorer 350 calculates and maintains reply scores of replies provided by users for content items. As described below, reply scores are used to determine whether to present a reply to a user along with its associated comment. Similar to a comment score, a reply score indicates a reply's popularity or likely popularity to users of the social networking system 208.

The reply scorer 350 calculates a reply score for a reply associated with a comment based on various characteristics of the reply. Examples of characteristics of a reply used to determine a reply score include: the total number of users that expressed a preference for the reply, the number of users that expressed a preference for the reply within a threshold time interval, the total number of times the reply has been unwanted as unwanted by users, the number of times the reply has been indicated as unwanted by users within a threshold time interval, whether the user that posted the comment showed a preference for the reply, whether the user that posted the content item associated with the comment indicated a preference for the reply, whether the user that posted the comment indicated the reply was unwanted, whether the user that posted the content item associated with the comment indicated the reply was unwanted, whether the user that posted the content item also posted the reply, whether the user that posted the comment also posted the reply, whether the social networking system 208 automatically indicated the reply as unwanted, and whether reply is associated with the same topic as the comment or the content item. In one embodiment, in various characteristics of a reply contribute a value to the reply score. The value may be a positive number, a negative number, or zero. As described above, various weights may be associated with different characteristics. The values of one or more characteristics are combined to calculate a reply score of the reply.

The reply scorer 350 may calculate an initial reply score when a reply is initially received by the social networking system 208 and update the reply score at periodic intervals. Alternatively, the reply scorer 350 updates a reply score when users interact with the corresponding reply (e.g., by expressing a preference for the reply or indicating the reply as unwanted).

The reply selector 355 selects replies for presentation to a user. When the comment ranker 345 selects comments for presentation to a requesting user, the reply selector 355 determines whether to present one or more of the replies associated with one or more of the selected comments. To determine whether to present a reply associated with a selected comment, the reply scorer 350 identifies one or more replies associated with the selected comment from the content store 310. For each identified reply, the reply selector 355 calculates an interest score indicating a measure of the likelihood that the requesting user will be interested in the reply.

To calculate a reply's interest score, the reply selector 355 identifies an affinity score between the requesting user and a user providing the reply from the affinity scorer 330 and retrieves a reply score for the reply from the reply scorer 350. The reply score indicates the popularity or likely popularity of the reply among social networking system users in general. The reply selector 355 combines the affinity score and reply score using any suitable method (e.g., summing the affinity score and reply score, multiplying the reply score and the affinity score, etc.) to determine the interest score for the reply.

In one embodiment, the reply selector 355 selects replies having at least a threshold interest score for presentation. If no replies have an interest score of at least the threshold interest score, the reply selector 355 does not select any replies associated with a comment for presentation. Replies having at least the threshold interest score are presented along with their associated comment. In one embodiment, a specified number of replies having at least the threshold interest score (e.g., two replies) are selected for presentation with the associated comment. In one embodiment, the reply selector 355 selects a number of replies having the highest interest scores for presentation. The reply selector 355 transmits the selected replies to the client device 202 for presentation with the comment. In various embodiments, the selected replies may be displayed chronologically based on when they were received by the social networking system 208, displayed based on their interest scores, or displayed based on any suitable criteria. When the selected replies are presented in the interface, the requesting user is also presented with an option to request a complete listing of replies associated with the comment. Additionally, when a comment is presented, the requesting user may provide an input requesting presentation of replies associated with the comment.

If the requesting user requests the replies of a comment, the reply selector 355 transmits the replies associated with the comment from the content store 310 to the client device 202 of the requesting user. The reply selector 355 also transmits instructions to the client device 202 of the requesting user for displaying the replies associated with a comment in chronological ordered starting with the earliest reply. Ordering replies in chronological order allows the requesting user to view conversations among users among the replies.

The web server 360 links the social networking system 208 via the network 204 to the one or more client devices 202, as well as to the one or more third party systems 206. The web server 360 serves web pages, as well as other content, such as JAVA®, FLASH®, XML and so forth. Additionally, the web server 360 may receive and route messages between the social networking system 208 and the client device 202, for example, instant messages, queued messages (e.g., email), text messages, short message service (SMS) messages, or messages sent using any other suitable messaging technique. A user may send a request to the web server 360 to upload information (e.g., images or videos) to store in the content store 310. Additionally, the web server 360 may provide application programming interface (API) functionality to send data directly to native client device operating systems, such as IOS®, ANDROID™, WEBOS® or RIM®.

Selection of Comments and Replies for Presentation to Users

Figure 4:
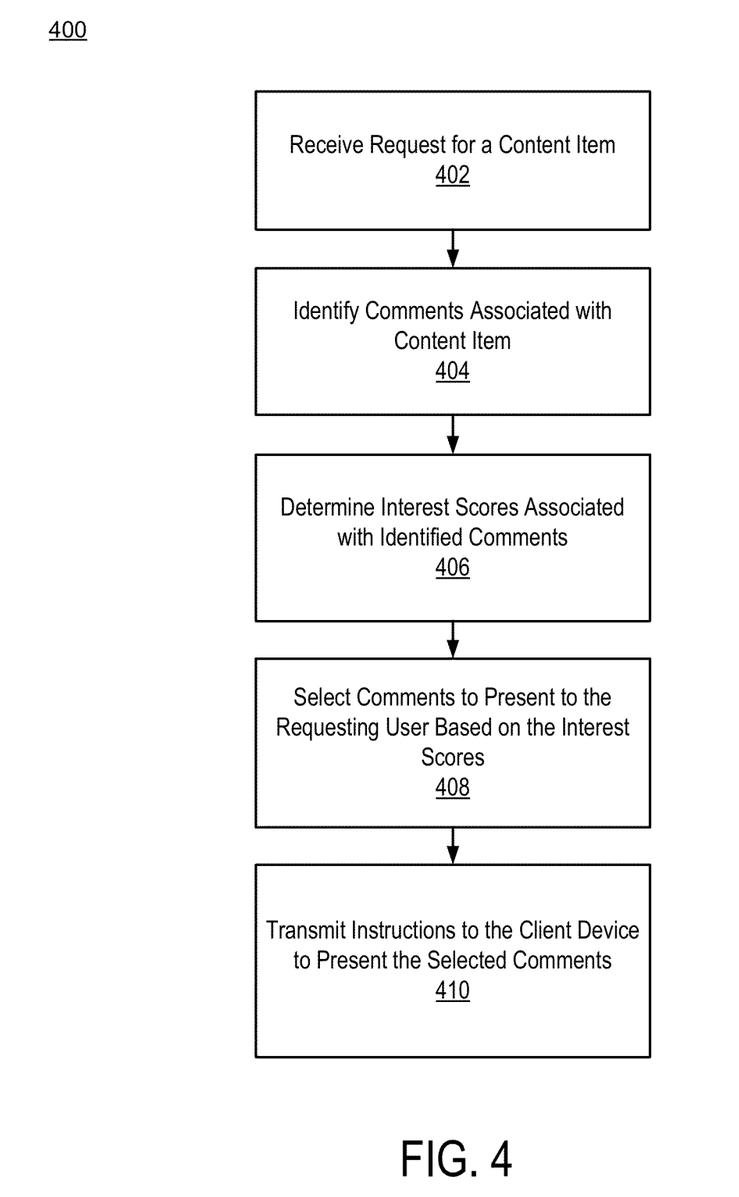
FIG. 4 is a flow chart of a process for selecting comments associated with a content item for presentation to a requesting user, in accordance with an embodiment of the invention.

FIG. 4 is a flow chart of one embodiment of a process 400 for selecting comments associated with a content item for presentation to a requesting user. The social networking system 208 receives 402 a request for a content item from a client device 202 of a requesting user. For example, the social networking system receives 402 a request to view a user profile or a newsfeed. The social networking system 208 identifies 404 one or more stored comments associated with the content item.

For each identified comment, the social networking system 208 calculates 406 an interest score indicating a measure of the likelihood that the requesting user will be interested in the comment. Calculation of an interest score for a comment is further described above in conjunction with FIG. 3. The social networking system 208 selects 408 comments for presenting the requesting user based on the interest scores associated with the comments. As described above in conjunction with FIG. 3, comments having at least a threshold interest score are selected 408 or comments having the highest interest scores are selected 408. The social networking system 208 transmits 410 instructions to the client device 202 to present the selected comments. In one embodiment, the transmitted instructions include an order for presenting the selected comments, which may be based at least in part on the interest scores associated with the selected comments.

Figure 5:
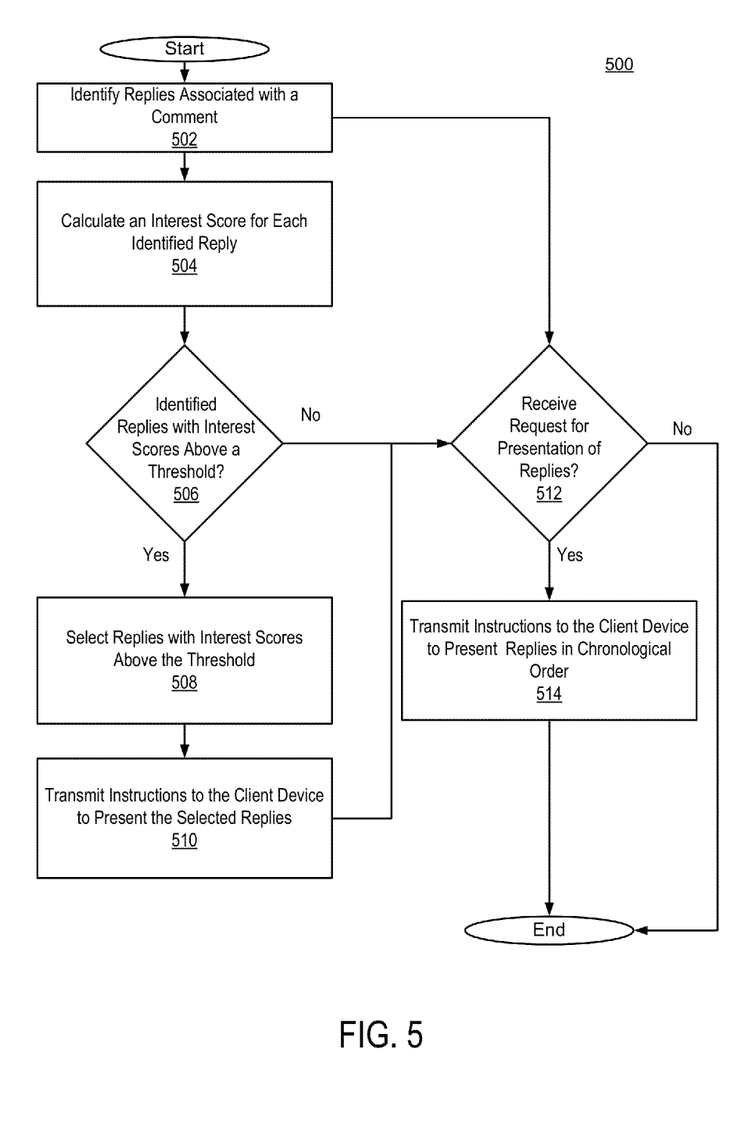
FIG. 5 is a flow chart of a process for selecting replies associated with a comment for presentation to a requesting user, in accordance with an embodiment of the invention.

FIG. 5 is a flow chart of one embodiment of a process 500 for selecting replies associated with one or more comments for presentation to a requesting user. When one or more replies are associated with a comment associated with a content item, the social networking system 208 identifies 502 the one or more replies associated with the comment. For each identified reply, the social networking system 208 calculates 504 an interest score that indicates a measure of the likelihood that the requesting user will be interested in the reply as described above in conjunction with FIG. 3.

The social networking system 208 determines 506 whether one or more identified replies are associated with an interest score equaling or exceeding a threshold. If no identified replies have interest scores at least equaling or exceeding the threshold, the process 500 ends and no replies are presented to the requesting user. However, if one or more replies have an interest score at least equaling or exceeding the threshold, the social networking system 208 selects 508 these replies for presentation to the requesting user. The social networking system 208 transmits 510 instructions to the client device 202 to present the selected replies, and may also specify presentation of the selected replies in an order, such as an order based on the interest scores of the replies.

If the social networking system 208 receives 512 a request from the requesting user to show replies associated with the comment, the social networking system 208 retrieves replies associated with the comment and transmits 514 an instruction to the client device 202 to present the retrieved replies in a chronological order based on the time and date when the replies were provided to the social networking system 208. The request to show replies may be received 512 when the comment is initially presented or after presentation of one or more selected replies.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, from a client device of a requesting user of a social networking system, a request for a content item associated with one or more comments representing information provided by users of the social networking system;
calculating an interest score for each of the comments associated with the content item, the interest score representing a measure of the requesting user's interest in a comment;
selecting a comment for presentation to the requesting user based at least in part on the calculated interest scores;
responsive to the selected comment having a plurality of replies to the comment, calculating for each of the plurality of replies an interest score representing a measure of the requesting user's interest in the reply, each of the plurality of replies by a user of the social networking system;
selecting a subset of replies from the plurality of replies based at least in part on the interest scores;
determining an order to present the subset of replies based at least in part on the interest scores calculated for the subset of replies;
transmitting instructions to the client device to present the selected comment and to present the selected subset of replies in the determined order and in association with the selected comment; and
responsive to receiving a request from the requesting user to view the plurality of replies, transmitting an instruction to the client device to present the plurality of replies in a chronological order based on a time associated with each of the plurality of replies.

2. The method of claim 1, wherein calculating the interest score for each of the comments associated with the content item comprises:
determining a comment score associated with a comment, the comment score representing a popularity of the comment among users of the social networking system;
determining an affinity between the requesting user and a user associated with the comment; and
generating an interest score for the comment based on the comment score and the affinity.

3. The method of claim 2, wherein the comment score is calculated based on a number of users that have expressed a preference for the comment.

4. The method of claim 2, wherein the comment score is calculated based on a number of times the comment has been indicated as unwanted.

5. The method of claim 2, wherein a user is associated with the comment and the comment score is calculated based on a number of users that have expressed a preference for comments with which the associated user is associated.

6. The method of claim 2, wherein a user is associated with the comment and the comment score is calculated based on a number of times comments with which the associated user is associated have been marked as unwanted.

7. The method of claim 2, wherein the comment score is calculated based on a reputation of a user associated with the comment.

8. The method of claim 2, wherein the comment score is calculated based on one or more from a group consisting of: a number of users that have expressed a preference for the comment with a threshold time period, a number of times the comment has be marked as unwanted within the threshold time period, whether a user associated with the content item is associated with the comment, whether the user associated with the content item expressed a preference for the comment, whether the user associated with the content item indicated the comment was unwanted, and any combination thereof.

9. The method of claim 1, wherein selecting the comment for presentation to the requesting user based at least in part on the calculated interest scores comprises:
selecting a number of comments having highest interest scores from the calculated interest scores.

10. The method of claim 1, wherein selecting the comment for presentation to the requesting user based at least in part on the calculated interest scores comprises:
selecting a number of comments having at least a threshold interest score.

11. The method of claim 1, wherein the subset of replies are selected based on each reply in the subset having at least a threshold interest score.

12. The method of claim 1, where the time associated with each of the plurality of replies is a time when the reply was received by the social networking system.

13. A computer program product comprising a computer-readable storage medium containing computer program code for:
receiving, from a requesting user of a social networking system, a request for a content item associated with one or more comments, each comment representing information provided a social networking system user;
calculating an interest score for each of the comments associated with the content item, the interest score representing a measure of the requesting user's interest in a comment;
selecting a comment for presentation to the requesting user based at least in part on the calculated interest scores;
responsive to the selected comment having a plurality of replies to the comment, calculating for each of the plurality of replies an interest score representing a measure of the requesting user's interest in the reply, each of the plurality of replies by a user of the social networking system;
selecting a subset of replies from the plurality of replies based at least in part on the interest scores;
determining an order to present the subset of replies based at least in part on the interest scores calculated for the subset of replies;
presenting the selected comment and the selected subset of replies in the determined order in association with the selected comment to the requesting user along with the associated content item; and
responsive to receiving a request from the requesting user to view the plurality of replies, presenting the plurality of replies in a chronological order based on a time associated with each of the plurality of replies.

14. The computer program product of claim 13, wherein calculating the interest score for each of the comments associated with the content item comprises:
- determining a comment score associated with a comment, the comment score representing a popularity of the comment among users of the social networking system;
- determining an affinity between the requesting user and a user associated with the comment; and
- generating an interest score for the comment based on the comment score and the affinity.

15. The computer program product of claim 13, wherein selecting the comment for presentation to the requesting user based at least in part on the calculated interest scores comprises:
- selecting a number of comments having highest interest scores from the calculated interest scores.

16. The computer program product of claim 13, wherein selecting the comment for presentation to the requesting user based at least in part on the calculated interest scores comprises:
- selecting a number of comments having at least a threshold interest score.

* * * * *